United States Patent
Dixon

(10) Patent No.: US 8,409,487 B2
(45) Date of Patent: Apr. 2, 2013

(54) PROCESSES AND SYSTEMS FOR MANUFACTURING SPARS AND OTHER HOLLOW STRUCTURES

(75) Inventor: Peter G. C. Dixon, Yorktown, VA (US)

(73) Assignee: Franklin D. Carson, Perkasie, PA (US)

( * ) Notice: Subject to any disclaimer, the term of this patent is extended or adjusted under 35 U.S.C. 154(b) by 0 days.

(21) Appl. No.: 12/875,368

(22) Filed: Sep. 3, 2010

(65) Prior Publication Data

US 2012/0056358 A1     Mar. 8, 2012

(51) Int. Cl.
B28B 7/32 (2006.01)

(52) U.S. Cl. ............ 264/314; 264/171.12; 264/171.13; 264/171.17; 264/171.26; 264/241; 264/255; 264/247; 264/259; 264/260; 264/261; 264/262; 264/263; 264/271.1; 264/272.13; 264/275; 264/279.1; 264/319; 264/632; 264/512; 264/515; 264/518; 264/520; 264/521; 264/522; 264/523; 264/545; 264/546; 264/547; 264/548; 264/552; 264/177.14; 264/209.1

(58) Field of Classification Search .............. 264/314, 264/36.15, 36.17, 46.6, 632, 512, 515, 516, 264/520, 523, 171.12, 171.26, 177.14, 177.15, 264/209.1, 267, 171.13, 171.17, 241, 255, 264/247, 259, 260, 261, 262, 263, 271.1, 264/272.13, 275, 279.1, 319, 518, 521, 522, 264/545, 546, 547, 548, 552
See application file for complete search history.

(56) References Cited

U.S. PATENT DOCUMENTS

| | | | | |
|---|---|---|---|---|
| 4,923,541 A | * | 5/1990 | Burger | 156/87 |
| 5,399,301 A | * | 3/1995 | Menendez et al. | 264/36.17 |
| 2002/0012765 A1 | * | 1/2002 | Debalme et al. | 428/98 |

* cited by examiner

Primary Examiner — Jeff Wollschlager
Assistant Examiner — Stella Yi
(74) Attorney, Agent, or Firm — Fox Rothschild LLP

(57) ABSTRACT

Processes for manufacturing hollow structures such as spars for helicopter rotor blades, fixed wings for aircraft, and other aerostructures can include the provision of a path for gases to exit the material from which the spar is formed as the material is heated and cured, to help eliminate voids within the material caused by the presence of such gases.

14 Claims, 16 Drawing Sheets

PROCESSES AND SYSTEMS FOR MANUFACTURING SPARS AND OTHER HOLLOW STRUCTURES

TECHNICAL FIELD

The processes and systems described herein relate to the manufacture of hollow structures, such as spars used in helicopter rotor blades, wings for fixed-wing aircraft, and other aerostructures.

BACKGROUND

A helicopter rotor blade functions as a rotating airfoil that or wing that is shaped to provide aerodynamic lift. The rotor blades can be subjected to a relatively complex set of extreme aerodynamic forces that vary continually during flight.

Helicopter rotor blades typically include a spar that extends from the root of the rotor blade to its tip. The spar is a major structural element that provides the rotor blade with most or all the structural strength required to carry its operational load. A typical rotor blade also incorporates a skin mounted on the spar. The skin forms an airfoil having a leading edge, a trailing edge, and upper and lower surfaces. Integral counterweights and balance-weight fittings can be incorporated into the spar during fabrication, or added to the blade assembly after fabrication of the spar.

The spar of a helicopter rotor blade is typically an elongated structure around which the rest of the rotor blade is formed. Many spars for helicopter blades incorporate a slight twist about their longitudinal axes to help achieve optimum aerodynamic performance. For example, spars having elliptical cross sections may incorporate a twist of up to approximately ten degrees between the root and tip thereof. In addition, the cross section of the spar may vary along its length to meet a variety of aerodynamic and structural loading parameters. For example, the cross sectional geometry of a spar may have a length-wise variation to accommodate different airfoil shapes along the length of the rotor that help achieve maximum aerodynamic performance.

Spars for helicopter rotor blades and other aerostructures can be formed from high-strength metals such as titanium and aluminum alloys. For example, titanium has been formed into relatively long tubular spars with a certain amount of twist on a routine basis.

Spars can also be formed from composite materials. The combination of high strength and light weight make the use of composite materials a popular choice for manufacturing the spar, as well as the remainder of the rotor blade.

A composite spar can be fabricated by applying layers or plies of uncured composite material to the surface of an elongated female mold having the desired distribution of contour and twist. Each layer of composite material can be formed from layers of continuous fiber reinforcements impregnated with a viscous, sticky epoxy resin. The partially-formed perform or laminate may be moved onto an undersized inflatable pressure bag or bladder supported internally by a stiff mandrel covered with styrofoam or another suitable supporting material. The pre-form can then be completed, or "closed-out," by adding additional layers of the composite material around the bladder, and around the exterior of the pre-form.

The bladder and foam-covered mandrel assembly has to be suitably undersized to provide clearance between the bladder and the interior surfaces, or inside mold line of unconsolidated pre-form, thus ensuring that the closed-out, wrapped pre-form will be undersized and transferable to a mold without interference.

The unconsolidated pre-form contains air that becomes trapped between layers of the pre-form during the hand layup process, resulting in extra bulk or thickness in the layed-up material. Moreover, the undersized bladder/mandrel/foam assembly can result in the presence of air between the bladder/mandrel/foam assembly and the inside mold line of the pre-form.

The pre-form can subsequently be placed in the mold. The composite material from which the pre-form is formed can be cured at an elevated temperature while being compacted or consolidated by the inflated bladder which urges composite material with molten resin outward against the interior surfaces of the mold.

Molten resin, air, and other gases can potentially become trapped in voids within the composite material during the curing process. In particular, as the inflated bladder expands it first contacts the high points on the upper and lower walls of the inside mold line of the pre-form, squeezing the molten resin and trapped air and other gases into those regions where the bladder bridges across (i) the low points on the walls the inside mold line of the pre-form, and/or (ii) over the inside of the corners of the pre-form.

For example, FIG. 15 depicts a cross section of a portion of a finished spar 102 formed using a conventional manufacturing process. The figure depicts pockets or voids 104 in the corners of the finished spar 102. These voids 104 are believed to have resulted from the presence of resin and gases trapped between the layers of composite materials during the curing and consolidation process, as shown in FIG. 16. FIG. 16 depicts the spar 102 being formed from a pre-form 10a which is being consolidated by a pressure bag or bladder 20a. The bladder 20a is depicted as pressing the pre-form 10a against interior surfaces of a mold 12a. The voids 104 tend to form in the corner regions of the pre-form 10a, where abrupt changes in shape that can make it difficult for adjacent layers of composite material in the pre-form 10a to contact each other. Voids 104 can form in other areas of the pre-form 10a as well.

The presence of the pockets or voids 104 between the layers of the composite material during the curing and consolidation process can adversely affect the ability of the bladder to exert a substantially uniform pressure on the composite material, which in turn can potentially compromise the compaction and consolidation process and result in localized areas of reduced strength in the finished spar 102. The presence of voids 104 between adjacent layers the pre-form 10a can also result in the voids 104 being permanently formed into the finished spar 102 as depicted in FIG. 15. Voids such as the void 104 can result in further localized reductions in strength in the finished spar 102.

Moreover, excess resins, and air and other gases can become trapped between the exterior surface of the bladder 20a and the interior surface of the pre-form 10a, and between the exterior surface of the pre-form 10a and the interior surface of the mold 12a during the curing and consolidation process, as shown in FIG. 16. This is due, in part, to the requirement that the un-inflated bladder 20a, and the underlying structure that supports the bladder 20a must necessarily be undersized in relation to the interior of the pre-form 10a to permit the bladder 20a and its supporting to be positioned within the pre-form 10a. When the bladder 20a is inflated during the consolidation process, this layer of air can become compressed between the bladder 20a and the interior surface of the pre-form 10a due to the force exerted by the bladder 20a, and the reactive force exerted by the pre-form 10a and the adjacent walls of the mold 12a. For example, the air between the bladder 20a and the pre-form 10a can be compressed from a pressure of approximately atmospheric, to a pressure of approximately 100 psi during consolidation of the pre-form.

The layer of trapped resin and air and other gases can prevent the pre-form 10a from being uniformly consolidated. For example, the trapped air will tend to migrate to "low spots" on the pre-form 10a as the pre-form is consolidated. The low spots typically occur at or near the corners of the pre-form 10a, and at other contoured areas at which the interior surface of the pre-form 10a undergoes an abrupt change in shape. The internal tension within the bladder 20a can keep the bladder from expanding to follow these contours. This results in "bridging" as shown in FIG. 16, and the formation of pockets or voids 105 between the bladder 20a and the pre-form 10a. Moreover, bridging of the pre-form 10a can result in voids 105 between the corner regions of the pre-form 10a and the adjacent surfaces of the mold 12a as also depicted in FIG. 16. The voids 105 can prevent the adjacent portions of the pre-form 10a from being properly consolidated.

Bridging can be particularly troublesome in the corner regions of the pre-form 10a due to the relatively abrupt changes in the geometry of the pre-form 10a at those locations, and the natural tendency of the inflated bladder 20a to assume a circular or spherical shape when it is not confined by an external force such as the contact force between the bladder 20a and the pre-form 10a. For example, as shown in FIG. 17, the inflated bladder tends 20a to contact the nearly flat upper and lower walls of the pre-form 10a, and makes point contact with the center region of the back wall or web of the pre-form 10a. The bladder 20a bridges the corner regions between the back wall and the upper and lower walls. Thus, the bladder 20a does not exert pressure on the corner regions (or on the underlying portions of the pre-form 10a).

As the resin in the pre-form 10a is heated and becomes fluid it tends to migrate to the lower-pressure regions inside the internal voids 104 within the pre-form 10a, and into the gap and voids 105 between the pre-form 10a and the bladder 20a can be forced toward the voids 105 formed at the corner regions of the pre-form 10a and at other low spots at which direct contact between the bladder 20a and the pre-form 10a does not occur. The hydrostatic pressure of the molten resin and the compressed air and other gases in these regions can prevent the bladder from exerting pressure on the underlying portions of the pre-form 10a. This can prevent those portions of the pre-form 10a from being properly consolidated, which in turn can result in localized reductions in strength in the finished spar 102.

SUMMARY

Processes for manufacturing hollow structures such as spars for helicopter rotor blades, fixed wings for aircraft, and other aerostructures can include providing a path for resin and gases to exit the material from which the hollow structure is formed as the material is cured and consolidated, to help eliminate voids within the material caused by the presence of such resin and gases.

Processes for manufacturing hollow structures such as spars for helicopter rotor blades, fixed wings for aircraft, and other aerostructures can also include providing a path for resin and gases to exit a gap or space between the material from which the hollow structure is formed and a bladder used to consolidate the material as the material is cured and consolidated, to help eliminate voids between the material and the bladder caused by the presence of such resin and gases.

Processes for forming hollow structures such as spars for helicopter rotor blades, fixed wings for aircraft, and other aerostructures from a pre-form can comprise providing, between the pre-form and an inflatable bladder, a passage through which resin and gases can flow, and placing the pre-form, the bladder, and the breather in a mold. The processes can also include inflating the bladder so that the bladder exerts a pressure on the pre-form, and heating the pre-form to cause at least a portion of the material from which the pre-form is formed to become molten and to assume a state of fluid communication with the passage, whereby resin and gases within the molten material can exit the molten material and enter the passage.

Processes for manufacturing hollow structures such as spars for helicopter rotor blades, fixed wings for aircraft, and other aerostructures can comprise placing a pre-form in a mold, heating the pre-form, and subjecting an interior surface of the pre-form to a pressure to urge an exterior surface of the pre-form into an adjacent surface of the mold. The processes can also include curing at least a portion of the material from which the pre-form is formed while providing a path for resin and gases within the material to exit the material and the mold.

Systems for manufacturing hollow structures such as spars for helicopter rotor blades, fixed wings for aircraft, and other aerostructures from a pre-form can comprise a mold having an interior surface having a shape that approximately matches a desired shape of an exterior surface of the spar, and an inflatable bladder capable of exerting a force against an interior surface of the pre-form. The systems can also comprise a breather attached to the bladder. The systems can further comprise a pressure-relief valve in fluid communication with the breather. The breather forms a passage for conducting resin and gases between the pre-form and the pressure-relief valve.

DESCRIPTION OF THE DRAWINGS

The foregoing summary, as well as, the following detailed description of embodiments, are better understood when read in conjunction with the appended drawings. The drawings are presented for illustrative purposes only, and the scope of the appended claims is not limited to the specific embodiments shown in the drawings. In the drawings:

DETAILED DESCRIPTION

Figure 1:
FIG. 1 is a side view of a hollow structure in the form of a spar that can be formed from a composite material and manufactured in accordance with a process that permits resin and gases to exit the material during the curing thereof.

Processes are provided for manufacturing hollow structures such as spars used in aerostructures such as helicopter rotor blades and wings for fixed-wing aircraft. An exemplary manufacturing process can be used to form a spar 14 from a pre-form 10. The spar 14 is depicted in FIG. 1. The spar 14 can have an open root or inner end 15a, and a closed tip or outer end 15b. The use of the exemplary process to manufacture this particular type of spar is disclosed for exemplary purposes only. The process disclosed herein, and variants thereof, can be used to form spars, and other hollow structures, having other configurations.

The pre-form 10 is depicted in FIGS. 2-5. The pre-form 10 can be formed from a composite material such as a glass fiber and/or graphite fiber-reinforced plastic matrix formed from, for example, epoxy, polyester epoxy polyamide, or thermoplastic materials. The pre-form 10 can be placed in a mold 12, heated, and cured to form the spar 14. The exemplary process can include provisions, discussed below, that can help to eliminate the presence of excess resin, and air and other gases within the pre-form material as the material is heated and cured.

The exemplary process is described in connection with a spar 14 formed from a composite material for exemplary purposes only. Alternative versions of the process can be used to form spars and other hollow structures from other materials.

An aft portion 10a of the pre-form 10 can be formed by placing layers 15 of the composite material on a strongback or mandrel (not shown) formed from a rigid material such as steel, to form a rearward or aft portion 10a of the pre-form 10. The exterior surface of the mandrel upon which layers 15 are placed can have a shape and surface features that approximate the desired shape and surface features of the interior surface of the aft portion of the spar 14.

Figure 5:
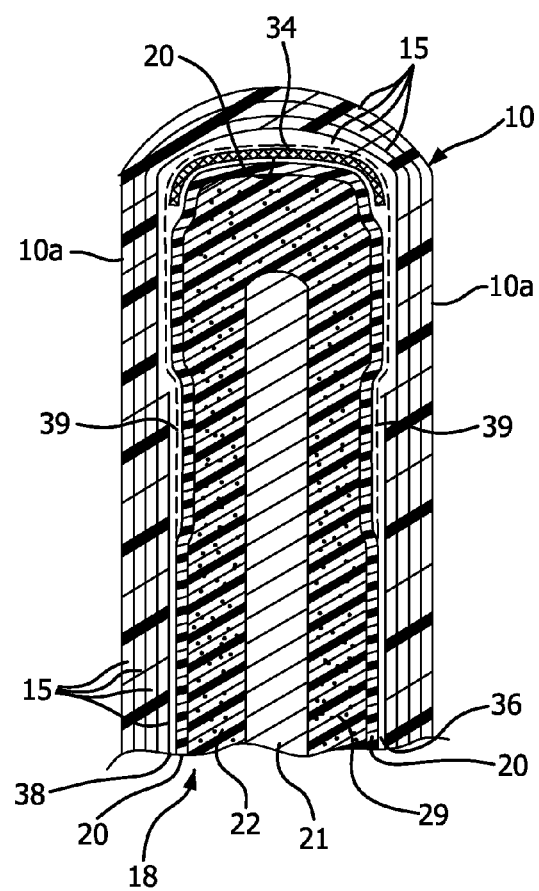
FIG. 5 is a cross-sectional side view of the bladder and mandrel assembly 18 shown in FIG. 4 with the pre-form shown in FIGS. 2 and 3 formed thereon.

The aft portion 10a of the pre-form 10 can be removed from the mandrel 16 upon completion. The aft portion 10a can subsequently be placed around a bladder and mandrel assembly 18 as shown in FIG. 5, and additional layers of the composite material 15 can be applied to form a forward portion 10b of the pre-form 10. The pre-form 10 is depicted with four layers 15 of the composite material for exemplary purposes only. The process described herein can be used in conjunction with pre-forms formed from more, or less than four layers 15.

Figure 4:
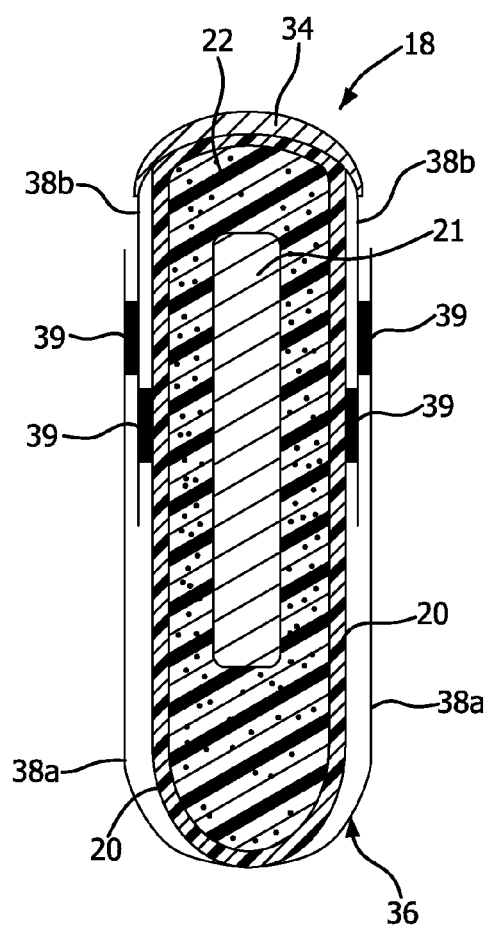
FIG. 4 is a diagrammatic, cross-sectional side view of a bladder and mandrel assembly 18 around which the pre-form shown in FIGS. 2 and 3 can be formed.

The bladder and mandrel assembly 18 can include an inflatable bladder 20, a mandrel 21 formed from a rigid material such as aluminum, and a layer of styrofoam 22 or other material that encases the mandrel 21 as shown in FIGS. 4 and 5. A relatively hard material can be used in lieu of styrofoam, but would require contour machining. The bladder 20 can be formed, for example, from ⅙-inch thick, 300-percent elongation silicone rubber. The bladder 20 can be formed from other materials in the alternative The bladder 20 is sized and shaped to fit snugly over the layer of styrofoam 22. The layer of styrofoam 22 have a shape and surface features that approximate the desired shape and surface features of the interior surface of the spar 14.

Figure 2:
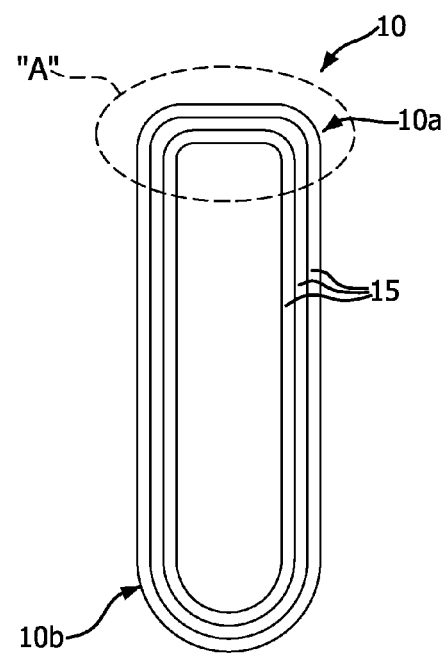
FIG. 2 is a side view of a pre-form from which the spar depicted in FIG. 1 can be formed.

For example, the spar 14 being manufactured using the exemplary process can have a substantially D-shaped cross section as shown in FIG. 2, with the curved portion of the "D" being the leading edge of the spar 14. Thus, the layer of styrofoam 22 can have a substantially D-shaped cross-section. The use of the process described herein to manufacture a spar 14 having a substantially D-shaped cross section is disclosed for exemplary purposes only. The process can also be used to form spars having cross sections of other shapes.

Figure 8:
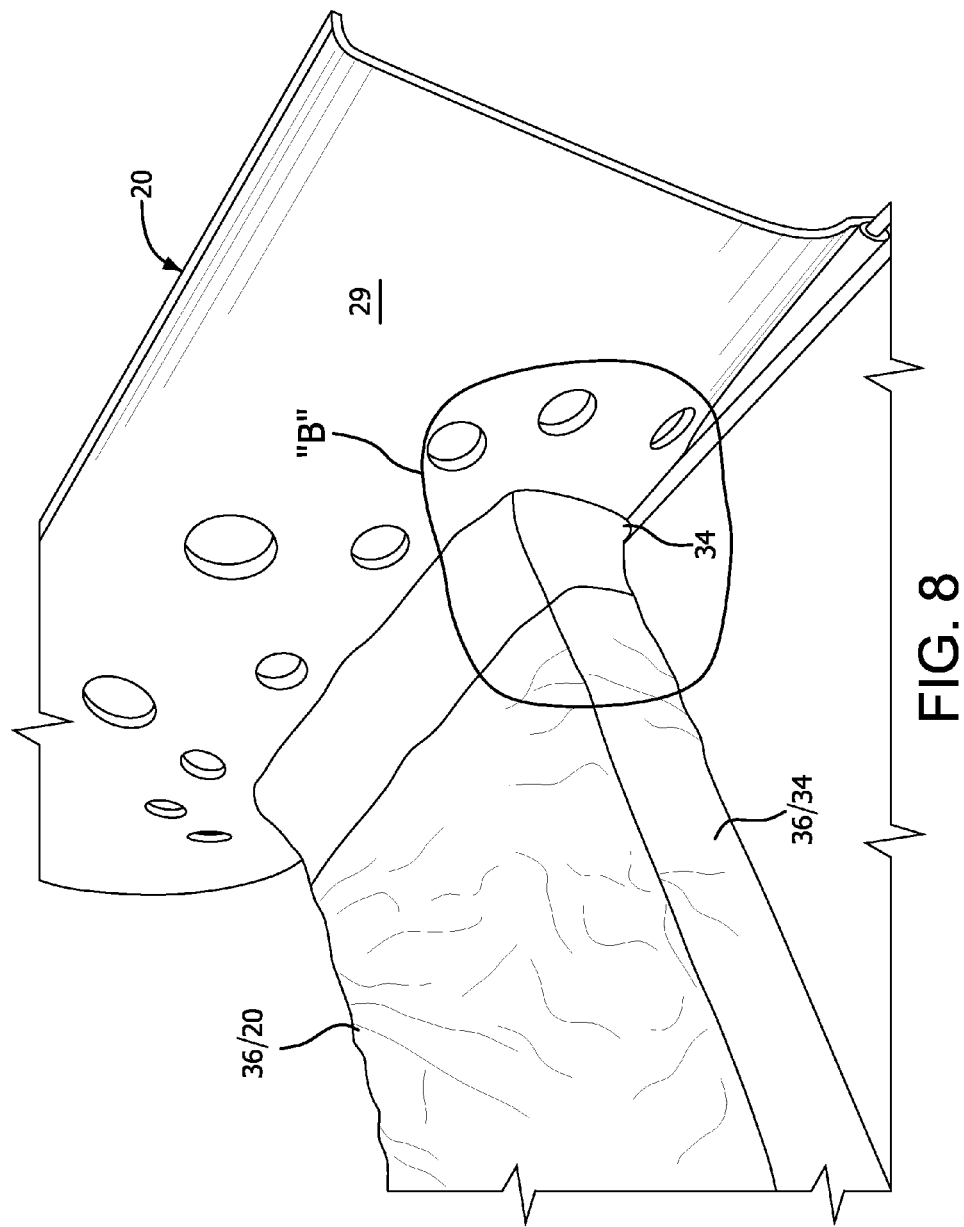
FIG. 8 is a rear-side view of a bladder of the bladder and mandrel assembly 18 shown in FIGS. 4 and 5, with a breather and release film attached to the exterior of the bladder.
Figure 9:
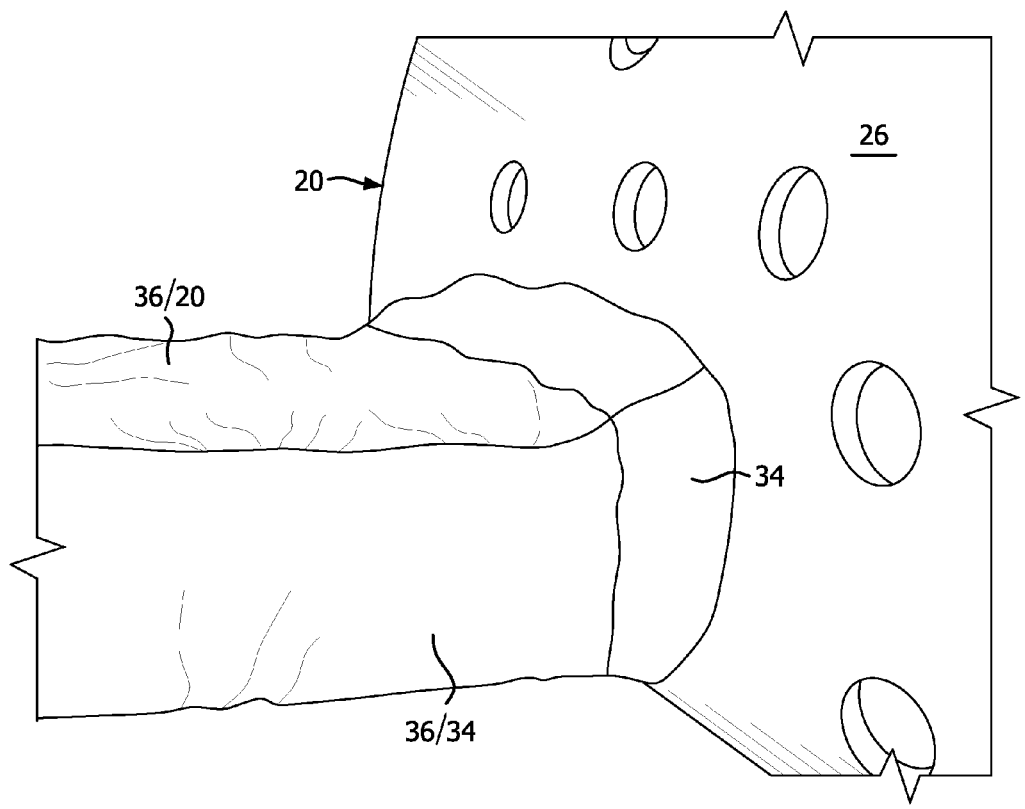
FIG. 9 is a magnified view of the area designated "B" in FIG. 8.
Figure 11:
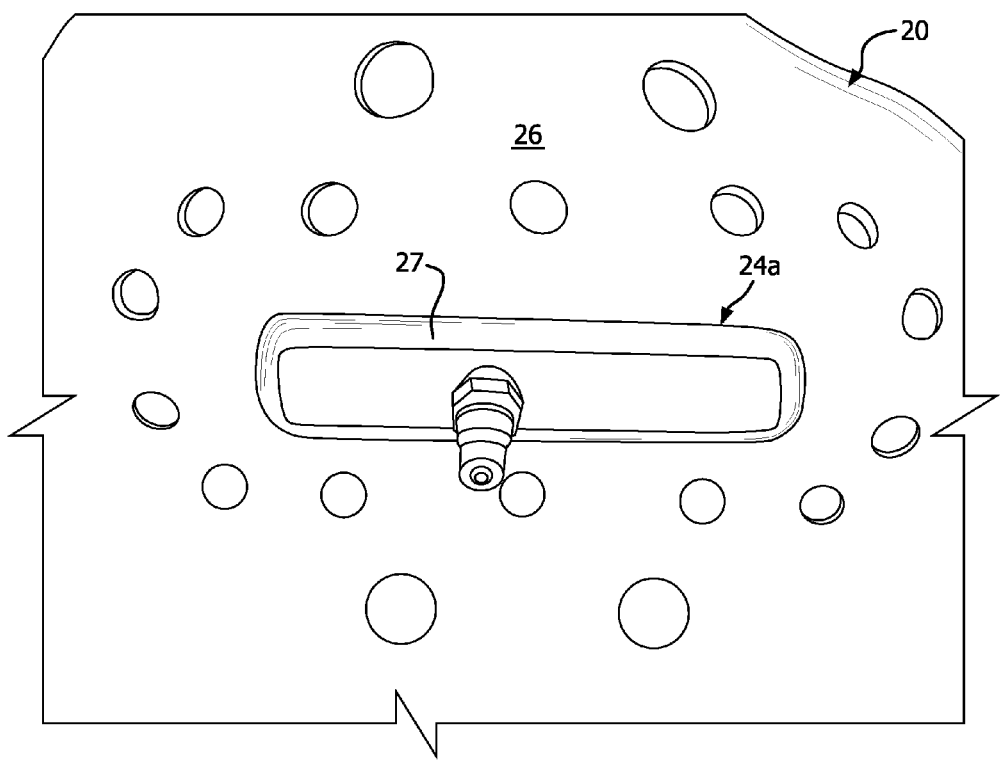
FIG. 11 is a top front view of a vacuum fitting installed on an open end of the bladder shown in FIGS. 8 and 9.

The bladder 20 has a closed end (not shown) that fits over a first end or lip of the layer of styrofoam 22. The bladder 20 also has an open end 24a that extends past a second end of the styrofoam 22 when the bladder is positioned on the sytrofoam 22. A flange 26 is formed on the open end 24a of the bladder 20, as shown in FIGS. 8, 9, and 11. The bladder 20 can be formed from a resilient material that is air-tight, i.e., impermeable to air. For example, the bladder 20 can be formed from a silicon elastomer.

A vacuum fitting 27 can be installed on the open end 24a of the bladder 20 before the aft and forward portions 10a, 10b of the pre-form 10 are positioned on the bladder and mandrel assembly 18. The vacuum fitting is depicted in FIG. 11. The interior of the bladder 20 can be subjected to a vacuum supplied via the vacuum fitting 27, to help deflate the bladder 20 and draw the bladder 20 snugly against the layer of styrofoam 22.

Figure 6:
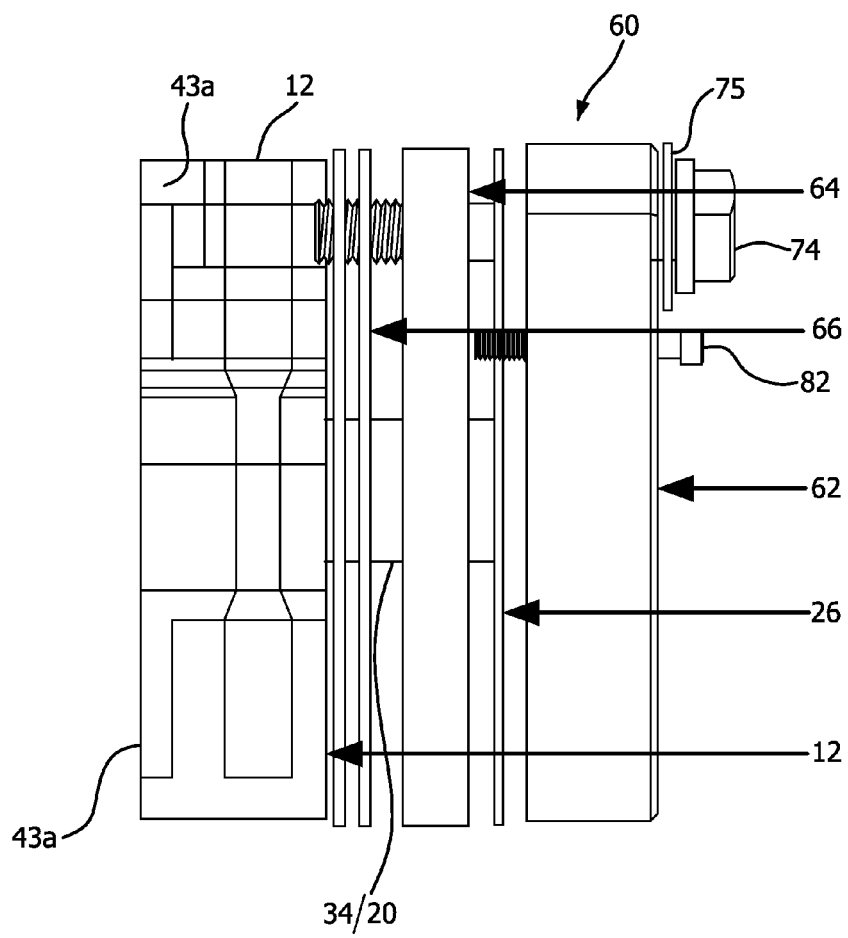
FIG. 6 is a schematic side view of a mold, and a pressure-relief valve in the form of and end plate assembly that can be used to form the spar shown in FIG. 1 from the pre-form shown in FIGS. 2, 3, and 5, depicting the end plate assembly in a partially-exploded view.

Moreover, a porous element in the form of a breather 34 can be positioned on the exterior surface of the bladder 20 before the aft and forward portions 10a, 10b of the pre-form 10 are positioned on the bladder and mandrel assembly 18. The breather is depicted in FIGS. 6, 8, and 9.

The breather 34 can be formed from a material having sufficient porosity to permit excess resin, and air and other gases to bleed out of the composite material from which the pre-form 10 is formed, and into the breather 34 during curing of the composite material. The breather 34, as discussed below, forms a passage that conducts the resin and gases to a pressure-relief valve in the form of an end plate assembly 60 that permits the resin and gases to exit the mold 12. It is believed that providing a means for excess resin, and air and other gases to be purged from the composite material can allow the bladder 20 to exert a more uniform pressure on the material during the curing process than would otherwise be possible, and can discourage the formation of voids in the material as the material cures.

The breather 34 can be fastened to the exterior surface of the bladder 20 using adhesive, such as Airtac 2 spray rubber adhesive available from Airtech Advanced Materials Group of Huntington Beach, Calif. Fastening means other than adhesive can be used in the alternative.

The breather 34 can have a thickness of approximately 1/16 inch, and a width of approximately 1.5 inch. These dimensions are presented for exemplary purposes only, and can vary with factors such as the dimensions of the pre-form 10. Moreover, more than one breather 34 can be used in alternative processes.

The breather 34 can extend between a first position at or near the closed end of the bladder 20, a second position near the open end 24a and flange 26 of the bladder 20 as shown in FIGS. 8 and 9. The breather 34 can be formed from a material that can maintain its porosity, and its corresponding ability to function as a passage for conducting resin and gases, when subjected to the heat and pressure of the curing process. For example, the breather 34 can be formed from AIRWEAVE® N4 breather fabric, available from Airtech Advanced Materials Group and comprising fibers formed from polyethylene terephthalate polymer.

A suitable release film 36 can be placed over the bladder 20 and the breather 34 before the aft and forward portions 10a, 10b of the pre-form 10 are placed on the bladder and mandrel assembly 18. The release film 36 can help facilitate separation of the spar 14 from the bladder 20 and the breather 34 after the composite material from which the spar 14 is formed has been cured. The release film is depicted in FIGS. 4, 8, and 9.

The release film 36 can be applied in two portions. A forward portion 38a of the release film 36 can be applied over the forward portions of the bladder 20 and the mandrel 22. An aft portion 38b of the release film 36 can be applied over the aft portion of the bladder 20 and mandrel 22, so that the aft portion 38b overlaps the breather 34, as shown in FIG. 4. The release film 36 is depicted in FIG. 4 as being spaced part from the underlying bladder 20 for clarity of illustration only.

The aft portion 38b of the release film 36 can have perforations formed therein to facilitate the passage of air therethrough. The perforations 37 can each have a diameter of, for example, approximately 0.02 inch. The perforations 37 can be spaced apart by, for example, approximately two inches. The perforations 37, as discussed below, permit excess resin, and air and other gases to pass from the composite material that make up the pre-form 10 to the breather 34 during curing of the material. The forward portion 38a of the release film 36 can be formed without perforations, so that the forward portion 38a is impermeable to air.

The forward portion 38a of the release film 36 can be, for example, A4000 FEP (fluorinated ethylene propylene) non-perforated release film having a thickness of 0.002-inch, available from Airtech Advanced Materials Group. The aft portion 38b of the release film 36 can be, for example, A4000P3 or A5000P3 FEP perforated release film having a thickness of 0.002-inch, available from Airtech Advanced Materials Group. Other suitable release films can be used in the alternative.

The aft portion 38b of the release film 36 can be installed on the bladder 20 prior to the forward portion 38a. The aft portion 38b can be installed using, for example, ½-inch by one-inch inch strips of double-sided tape 39 placed on both sides of the bladder 20 as shown in FIG. 4. The tape strips 39 can be placed approximately every six inches along the length of the bladder 20. The tape strips 39 can be positioned so as to be located proximate the edges of the aft portion 38b as depicted in FIG. 4. The outwardly-facing surfaces of the tape strips 39 adhere to the inwardly-facing surface of the aft portion 38b of the release film 36, thereby securing the aft portion 38b to the bladder 20.

Figure 3:
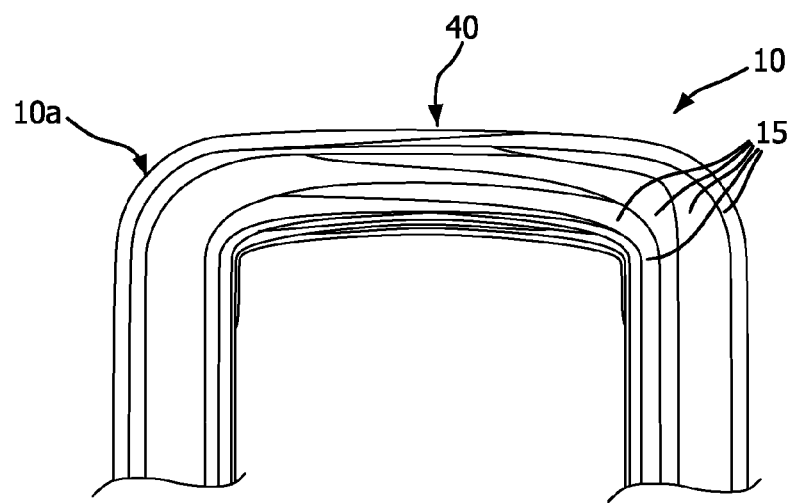
FIG. 3 is a magnified view of the area designated "A" in FIG. 2.

The respective widths of the forward portion 38a and aft portion 38b of the release film 36 can be chosen so that the ends of the forward portion 38a overlap the ends of the aft portion 38b as shown in FIG. 3. For example, the width of the forward portion 38a can be approximately fourteen inches, and the width of the aft portion 38b can be approximately eight inches. Specific dimensions for the forward and aft portions 38a, 38b of the release film are presented for exemplary purposes only. The dimensions of the forward and aft portions 38a, 38b can vary with the dimensions of the mandrel 22 and bladder 20.

The forward portion 38a of the release film 36 can be installed using additional double-sided tape strips 39 placed on the outwardly-facing surface of the aft portion 38b of the release film 36, as shown in FIG. 4. The additional tape strips 39 can be placed approximately every six inches along the length of the aft portion 38b. The additional tape strips 39 can be positioned so as to be located between the overlapping areas of the forward portion 38a and aft portion 38b, as depicted in FIG. 4. The outwardly-facing surfaces of the additional tape strips 39 adhere to the inwardly-facing surface of the forward portion 38b, thereby securing the forward portion 38a to the aft portion 38b and the bladder 20.

Other fastening means, such as adhesive, can be used in lieu of the tape strips 39 to fasten the release film 36 to the bladder 20 and the breather 34.

The above-noted installation procedure for the forward and aft portions 38a, 38b of the release film 36 is described for exemplary purposes only. For example, in alternative processes the forward portion 38a can be installed before the aft portion 38b, and the forward and aft portions 38a, 38b can be configured so that the forward portion 38a is wider than, and overlaps the aft portion 38b. Moreover, the release film 36 can be applied in more, or less that two portions in alternative processes.

The aft portion 10a of the pre-form 10 can be placed on the mandrel 20 after the breather 34 and release film 36 have been applied over the bladder 20. Additional layers 15 of the composite material can be placed over the bladder 20 to form the forward portion 10b of the pre-form and thereby complete the formation or layup of the pre-form 10. The forward portion 10b of the pre-form 10 is depicted in FIG. 2.

The ends of the layers of composite material 15 from which the pre-form 10 is formed can overlap in an interleaved fashion as shown in FIG. 3, so that the ends of the layers 15 form the interleaved joint 40. The interleaved layers provide slip planes to accommodate the increased line length of the inside perimeter of the pre-form 10 as pre-form 10 is expanded during the consolidation process. The use of a pre-form 10 with an interleaved joint 40 is described for exemplary purposes only. The methods and systems disclosed herein can also be used in connection with pre-forms incorporating a scarf joint and other types of joints in lieu of interleaved joints.

Figure 12:
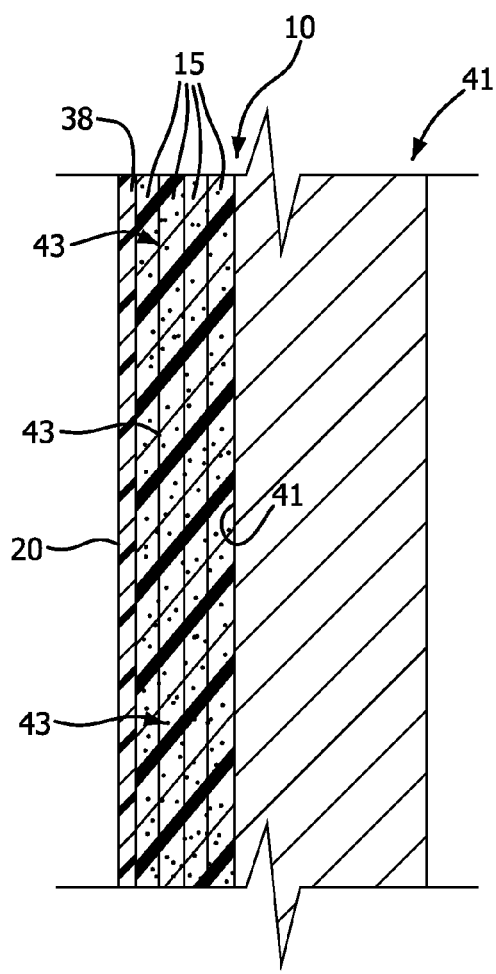
FIG. 12 is a cross-sectional side view of the bladder shown in FIGS. 8, 9, and 11 urging a portion of the pre-form shown in FIGS. 2, 3, and 5 against an interior surface of the mold shown in FIGS. 6 and 7.

The pre-form 10 and the enclosed bladder and mandrel assembly 18 can be placed in the mold 12 and cured in a heating device such as an oven. The mold 12 has interior surfaces 41 shaped to substantially match the desired shape of the exterior surfaces of the spar 14. A portion of an interior surface 41 is depicted in FIG. 12. The bladder 20 can be inflated during the curing process to expand the pre-form 10 against the interior surfaces 41 of the mold 12 as denoted by the arrows 43 in FIG. 12, thereby shaping the pre-form 10 into the desired shape of the spar 14. For example, as discussed above, the spar 14 being manufactured using the exemplary process can have a substantially D-shaped cross section. Thus, the interior surfaces of the mold 12 against which the pre-form 10 is expanded can be configured to form the pre-form 10 into a substantial D-shape when viewed in cross section.

The pre-form 10 and the bladder and mandrel assembly 15 can subsequently be positioned in the internal cavity of the mold 12 while the mold 12 is open, i.e., while a top portion 43a of the mold 12 is removed, and while the vacuum is maintained within the bladder 20. The top portion 43a can subsequently be moved into position over the bladder 20 and secured to a bottom portion 43b of the mold 12 to close the mold 12. The top and bottom portions 41a, 41b of the mold 12 are depicted in FIG. 6. The vacuum within the bladder 20 can subsequently be discontinued, and the fitting 27 can be disconnected from the bladder 20. A portion of the bladder 20 that includes the flange 26 and the open end 24a extends out of an end of the mold 12 once the mold 12 has been closed, as shown in FIG. 6.

The end plate assembly 60 can subsequently be installed on the first end of the mold 12. The end plate assembly 60 comprises a rigid manifold plate 62, a rigid pressure-relief plate 64, and two resilient gaskets 66, and shown in FIGS. 6, 7, and 10. The use of two gaskets 66 is disclosed for exemplary purposes only. More, or less than two gaskets 66 can be used in the alternative. The end plate assembly 60 closes and seals the end of the mold 12, while permitting pressurized air to be directed to the interior of the bladder 20 and permitting resin and gases purged from the pre-form 10 via the breather 34 to exit the mold 12.

The gaskets 66 can be formed from a suitable resilient material such as a silicon rubber material designated 9655U and available from CHR Industries of New Haven, Conn. Other materials can be used for the gaskets 66 in the alternative.

The pressure-relief plate 64 has a center opening formed therein that accommodates the bladder 20, as shown in FIG. 6.

Figure 10:
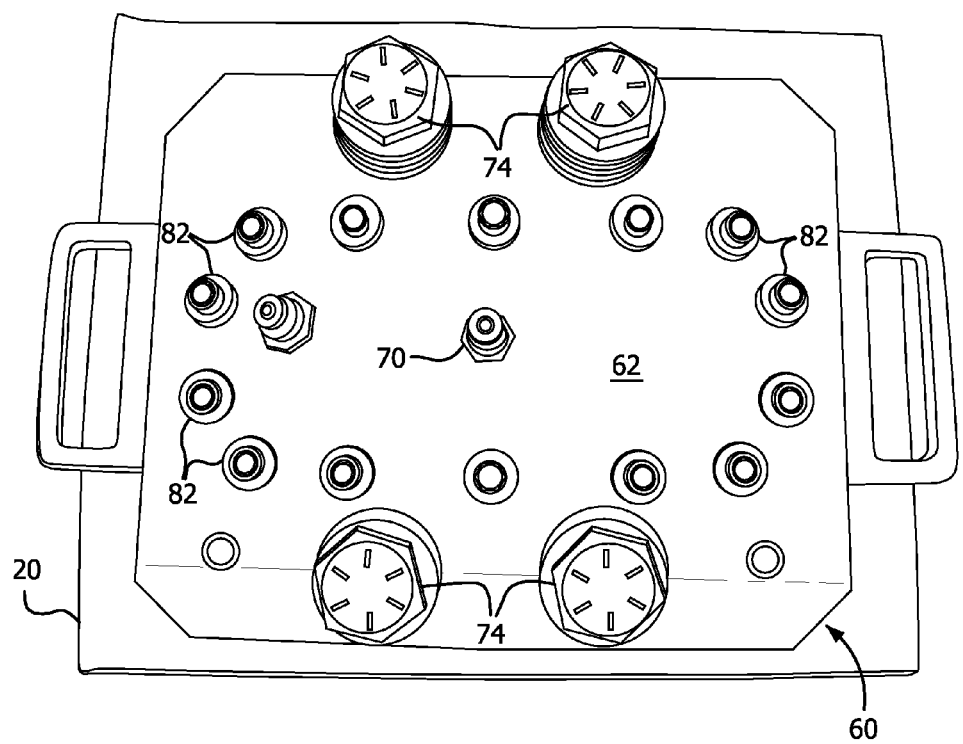
FIG. 10 is a front view of a manifold plate of the end plate assembly shown in FIGS. 6 and 7.

The manifold plate 62 includes a fitting 70 that permits pressurized air to pass through the manifold plate 62, as shown in FIG. 10. The fitting 70 can be connected to a hose, pipe, or other conduit that is connected to a source of pressurized air or other suitable gas (not shown).

Figure 7:
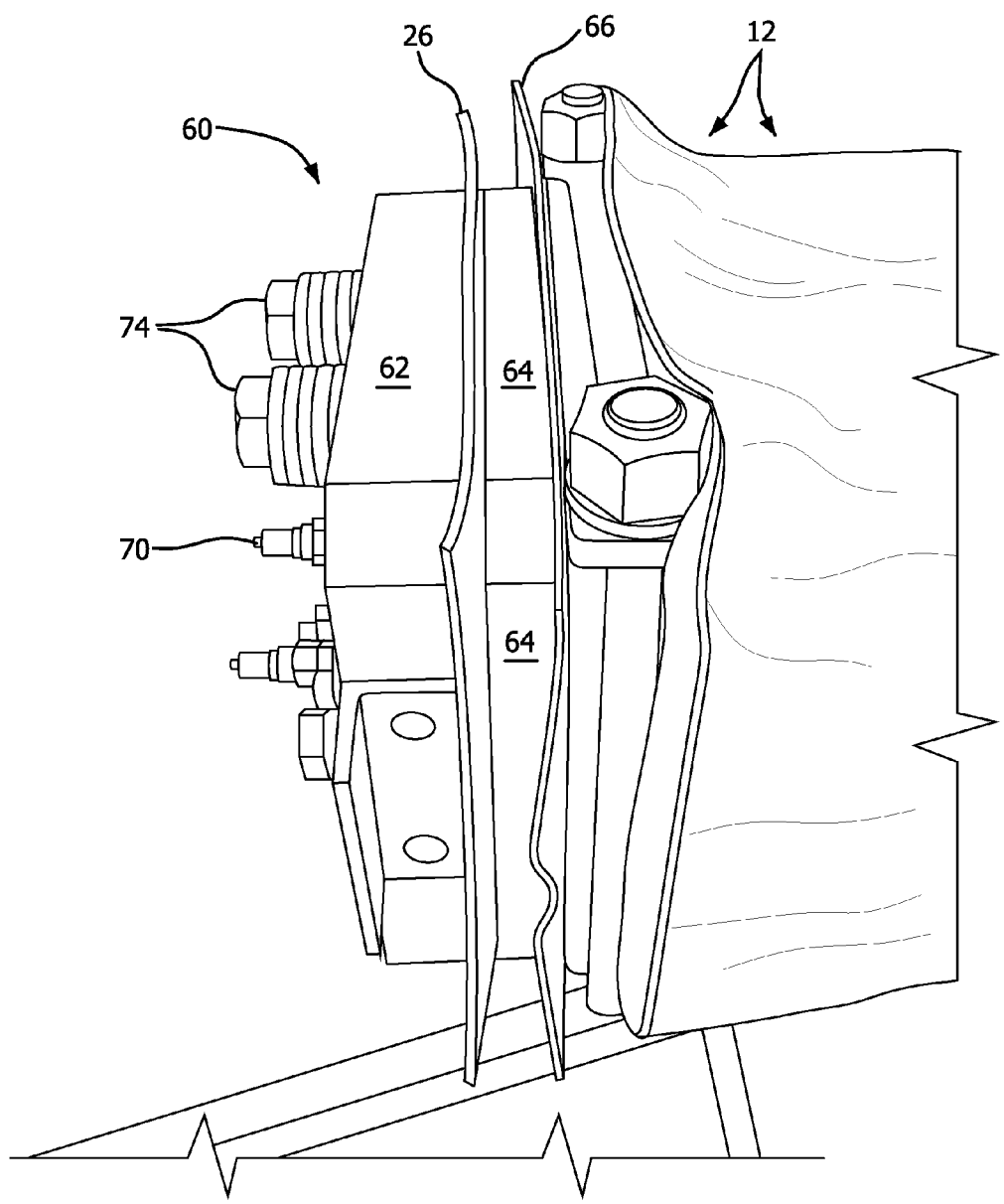
FIG. 7 is a top-side view of the end plate assembly and the mold shown in FIG. 6.

The end plate assembly 60 can be assembled on the mold 12 as follows. The flange 26 can be pulled through the gaskets 66 and the center opening 65 of the pressure-relief plate 64, so that the gaskets 66 and pressure-relief plate 64 are positioned between the mold 12 and the flange 26 as shown in FIGS. 6 and 7. The flexibility and resilience of the flange 26 permits the flange 26 to be resiliently deformed as it is pulled though the gaskets 66 and pressure-relief plate 64. The manifold plate 62 can subsequently be positioned over the outwardly-facing side of the flange 26 so that the flange 26 is sandwiched between the manifold plate 62 and the pressure-relief plate 64 as shown in FIG. 7, and the manifold plate 62 and the pressure-relief plate 64 exert a clamping force on the flange 26. A size for the of the with a suitable margin of safety.

The mold 12, gaskets 66, pressure-relief plate 64, and manifold plate 62 can each include through holes that accommodate four one-inch-diameter bolts 74 with one or more washers 75 on the head of each bolt 74. Holes can be cut in the flange 26 of the bladder 20 to accommodate the bolts 74, as shown in FIGS. 8, 9, and 11. The bolts 74 connect the end plate assembly 60 to the mold 12, and support the weight of the end plate assembly 60. The holes in the gaskets 66, pressure-relief plate 64, and manifold plate 62 can be aligned with the corresponding holes in the mold 12, and the bolts 74 can be installed and tightened to fasten the gaskets 66, pressure-relief plate 64, and manifold plate 62 to the mold 12. A particular size for the bolts 74 is specified for exemplary purposes only. The size and number of the bolts 74 can vary by application, and should be sufficient to react the pressure within the inflated bladder 20 suitable margin of safety.

During installation, each bolt 74 can be torqued so as prevent its associated washer 75 from being rotated by hand. The toque on the bolt 74 can then be backed-off so that the washer 75 can be rotated by hand. This procedure, as discussed below, helps to ensure that excess resin, and air and other gases within the mold 12 can exit the mold 12 by seeping past the gasket 66.

A set of cap screws 82, shown in FIG. 10, or another suitable fastening means can be installed to form an airtight seal between the pressure-relief plate 64, the flange 26 of the bladder 20, and the manifold plate 62. The cap screws 82 can be inserted through through-holes 84 formed in the manifold plate 62. Holes can be cut in the flange 26 of the bladder 20 to accommodate the cap screws 82, as shown in FIGS. 8, 9, and 11. The cap screws 82 can be secured to the pressure-relief plate 64 via threaded blind holes 86 formed therein. The cap screws 82, upon being tightened, cause the pressure-relief plate 64 and the manifold plate 62 to compress or squeeze the flange 26 of the bladder 20, thereby forming a seal that inhibits the pressurized air being directed into the interior of the bladder 20 from leaking past the interface of the flange 26, manifold plate 62, and pressure-relief plate 64. The cap screws 82 can be have a diameter of, for example, ⅜-inch.

Specific values for the numbers and sizes of the bolts 74 and the cap screws 82 are disclosed for exemplary purposes only. The optimal number and size of the bolts 74 and the cap screws 82 can vary by application.

Other types of pressure-relief valves can be used in lieu of the end plate assembly 60 in alternative processes.

The source of pressurized air can be connected to the manifold plate 62 so that pressurized air can be supplied to the interior of the bladder 20 to inflate the bladder 20.

Prior to being heated and cured, the pre-form 10 can be further shaped or "bumped" using the bladder 20, as follows. As discussed above, the washers 75 associated with the bolts 74 should be rotatable by hand to ensure a path for excess resin, and air and other gases within the mold 12 to escape the mold 12 past the gasket 66. Pressurized air can be supplied to the bladder 20 via the manifold plate 62. The air pressure within the bladder 20 can be raised to approximately 65+/−5 pounds per square inch gauge (psig) at a maximum rate of approximately 20 psi per minute, and held at this pressure for approximately ten+/−one minutes. The air pressure in the bladder 20 can then be reduced to approximately zero psig, and held at this level for approximately three+/−0.5 minutes.

The above pressurization and depressurization process can subsequently be repeated two times. This bumping process is believed to help set up the sliding motion between the plies or layers 15 of composite material 15 in the interleaved joint 40 that is be necessary to allow the line length of the inner perimeter of the pre-form 10 to increase during the consolidation process.

The air pressure within the bladder 20 can then be raised to approximately 100 psi to approximately 120 psi, at a maximum rate of approximately 20 psi per minute. The supply of pressurized air can be shut off once the internal pressure within the bladder 20 reaches the target value, and the bladder 20 can be checked for leaks.

For example, a leak check can be performed by observing the pressure within the bladder 20 for at least five minutes after the supply or pressurized air has been shut off, and noting any pressure drop that occurs. A pressure drop of approximately 10 psi or more over five minutes can be indicative of a leak. Thus, if the pressure drop over five minutes does not exceed approximately 10 psi, the pre-form 10 and the bladder and mandrel assembly 18 can be moved to the oven and the curing of the pre-form 10 can be started.

If the pressure drop over five minutes exceeds approximately 10 psi, an investigation can be undertaken to identify the source of, and if possible, repair the leak. Following the repair, the bladder 20 can be re-inflated and the above leak check procedure can be repeated to verify that the leak has been eliminated. The pre-form 10 and the bladder and mandrel assembly 18 can then be moved to the oven and the curing of the pre-form 10 can be started.

If it is not possible to eliminate the leak, the supply of pressurized air to the interior of the bladder 20 can be resumed so that the pressure within the bladder 20 can be maintained at the target value of approximately 110+/−5 psig as the pre-form 10 and the bladder 20 and the mandrel assembly 18 are placed in the oven and the final preparations for the curing process are completed.

The above processes for bumping the pre-form 10 and leak testing the bladder 20 are optional, and are specified for exemplary purposes only. Other processes for bumping and leak testing can be used in the alternative.

The pre-form 10 can be heated to a temperature or range of temperatures, such as approximately 150° F.±10° F., that cause the resin in the pre-form 10 to become molten. The bladder 20 is inflated by the pressurized air supplied thereto, and thus expands outwardly against the pre-form 10. The inflated bladder 20 pushes the pre-form 10 outwardly, against the interior surfaces of the mold 12, to form the pre-form 10 into the desired shape of the spar 14. After the pre-form 10 has been heated to cause the resin in the pre-form material 10 to melt, the resin can be allowed to cure at a predetermined temperature or range or temperatures for a predetermined length of time while the bladder 20 remains pressurized.

The bumping cycle can be applied three times at a temperature the exceeds the resin gel temperature by a minimum of approximately 50° F., to facilitate and encourage sliding between the layers of the composite material 15 within the interleaved joint 40 as the perimetral line length of the inside layers or plies increases as the span wall thickness of the pre-form 10 decreases during the consolidation process. For example, the bumping cycle can be applied at a temperature of approximately 150° F.±10° F.

Figure 13:
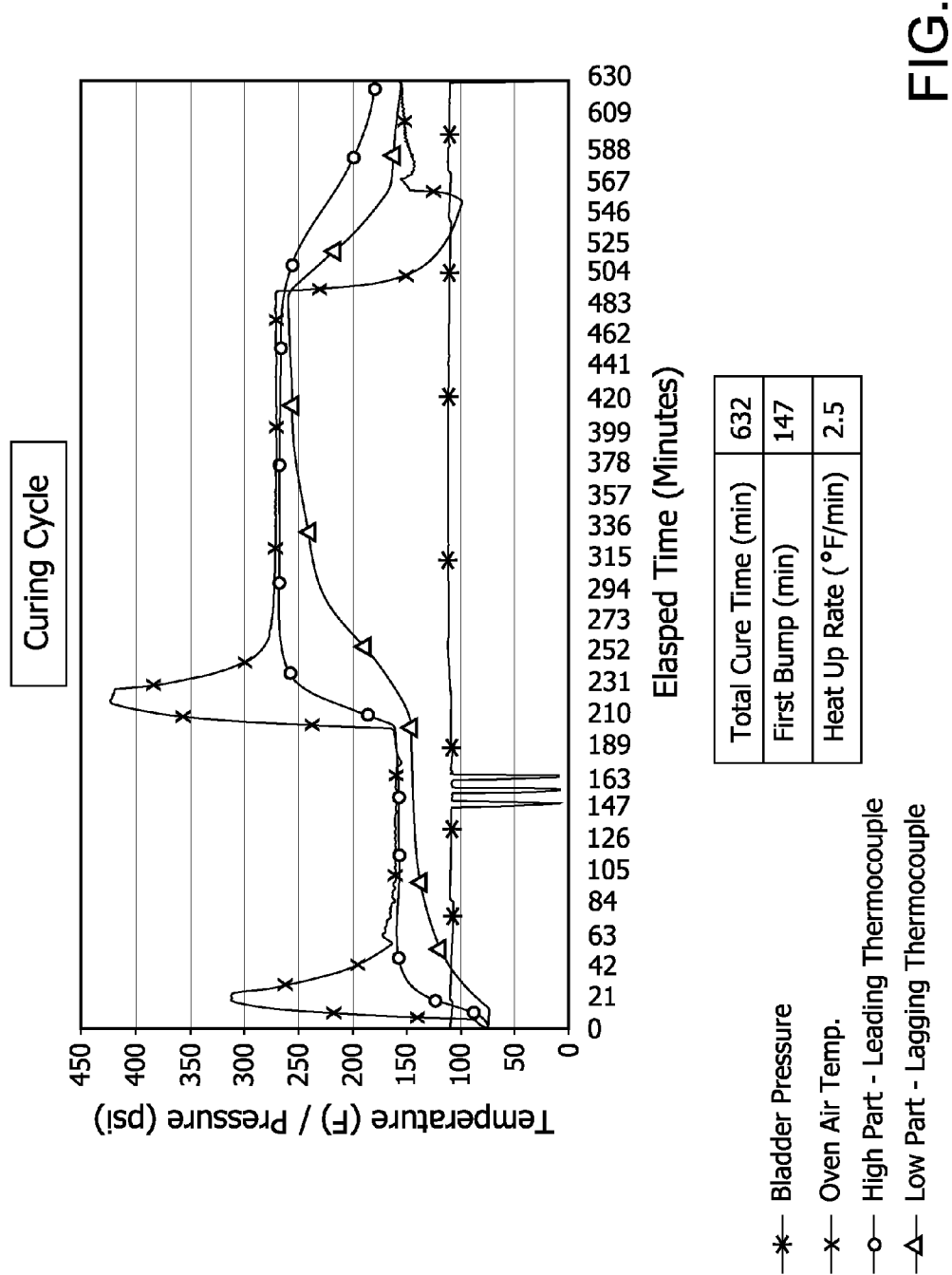
FIG. 13 is a graphical representation of a curing and consolidation cycle that can be used to manufacture the spar shown in FIG. 1 from the pre-form shown in FIGS. 2, 3, 5, and 12.

FIG. 13 depicts exemplary temperature vs. time and bladder pressure vs. time profiles for the curing and consolidation cycle. (FIG. 13 des not depict the above-described "cold bumping" that occurs prior to the cycle.) This specific curing and consolidation cycle is presented for exemplary purposes only. The temperatures and pressures for the curing and consolidation cycle can vary by application with factors such as the material from which the pre-form 10 is formed and the size of the pre-form 10.

As discussed above, the slip planes provided by the interleaved layers of the interleaved joint 40 permit the line length of the inside perimeter of the pre-form 10 to increase as the bladder expands the pre-form 10 during the consolidation process.

Once the curing and consolidation cycle has been completed, the mold 12 can be removed from the oven and the source of pressurized air can be disconnected from the manifold plate 62. The top half 41a of the mold 12 can be removed, and the newly-formed spar 12 and the bladder and mandrel assembly 18 can be removed from interior of the mold 12. The bladder and mandrel assembly 18 can be removed for the interior of the spar 12 by way of the open end of the spar 12. Any release film 36 remaining on the interior of the spar 14 can subsequently be removed.

The breather 34 forms a path for excess resin, air, and other gases to exit, or bleed out of the pre-form 10 and, together with excess resin, air, and other gases trapped between the bladder 20 and the pre-form 10, to exit the mold 12 as the material from which the pre-form 10 is formed is melted and cured. As discussed above, pockets of molten resin, air, and other gases can be present, for example, in the localized voids that normally exist between the individual plies or layers 15 of the laminated pre-form 10, particularly in the corner regions and other locations where the pre-form 10 undergoes a relatively sharp turns or curves. Moreover, a layer of molten resin, air, and other gases can also be present between the exterior surface of the bladder 20 and the interior surface of the pre-form 10 due to the need to undersize the bladder 20 and the underlying support structure to permit these components to be installed within the pre-form 10. The resin and gases can become trapped within the pre-form 10, or between the pre-form 10 and the bladder 20 during the curing process, and can prevent the bladder 20 from exerting a substantially uniform pressure on the perform 33 which in turn can cause a localized weakening of the spar 14. Moreover, the resin and gases trapped between the plies or layers 15 of the pre-form 10 can also result in permanent voids in the finished spar 14, which can also cause a localized weakening of the spar 14.

The breather 34 is located in the gap between the pre-form 10 and the bladder 20. Molten resin, air, and other gases present in the gap can reach the breather 34 by way of the perforations in the aft portion 38a of the release film 36. Once the resin and gases enter the breather 34, the porosity of the breather 34 facilitates migration of the resin and gases out of the gap and to the end plate assembly 60 which, as discussed below, permits the resin and gases to escape from the mold 12. (In practice, it is believed that relatively small amounts of molten resin can migrate into the breather 34, which can help form a path for excess resin, and air and other gases to reach the breather 34.)

Moreover excess resin, and air and other gases that migrate out of the inter-layer voids in the pre-form 10 and into the gap between the pre-form 10 and the bladder 20 likewise can escape by way of the breather 34 and the end plate assembly 60.

The breather 34, as discussed above, can extend between a first position at or near the closed end of the bladder 20, and a second position at or near the open end 24a of the bladder 20 as shown in FIGS. 6, 8, and 9. The second position is located proximate the gaskets 66 of the end plate assembly 60 as shown in FIG. 6, so that the end of the breather 34 and the inner circumference of each gasket 66 are exposed to a common volume defined by the mold 12 and the end plate assembly 60. The end of the breather 34, therefore, is in fluid communication with the inner circumference of each gasket 66.

The resin and gases that enter into the breather 34 from the molten or partially-molten resin are compressed or pressurized due to the force exerted by the inflated bladder 20, and can pass through the breather 34 due to the porosity of the breather 34. The inner circumference of each gasket 66 is thus exposed to the pressurized resin and gases. The outer circumference of each gasket 66 is exposed to the environment within the oven, which is maintained at a pressure approximately equal to atmospheric pressure. A pressure differential can thus exist across the gaskets 66 when the pressurized resin and gases are present in the breather 34.

The pressure differential across the gaskets 66, when it becomes large enough, can result in seepage of the pressurized resin and gases past the gaskets 66 and into the ambient environment around the mold 12. In particular, as discussed above, the bolts 74 that fasten the end plate assembly 60 to the mold 12 can be torqued to a predetermined value, and then must be backed off until the underlying washers can be rotated by hand so as to facilitate seepage past the gaskets 66. The end plate assembly 60, by permitting seepage in the manner, can act as a one-way pressure-relief valve that permits the resin and gases exiting the molten resin by way of the breather 34 to be purged from the mold 12.

Figure 14:
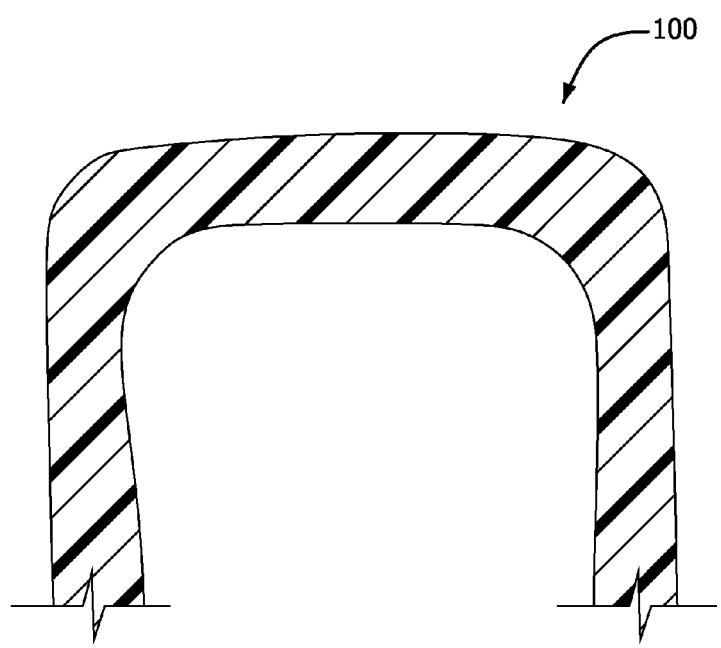
FIG. 14 is a cross-sectional side view of a the spar that was formed from a composite material and manufactured in accordance with a process that permits resin and gases to exit the material during the curing thereof.
Figure 15:
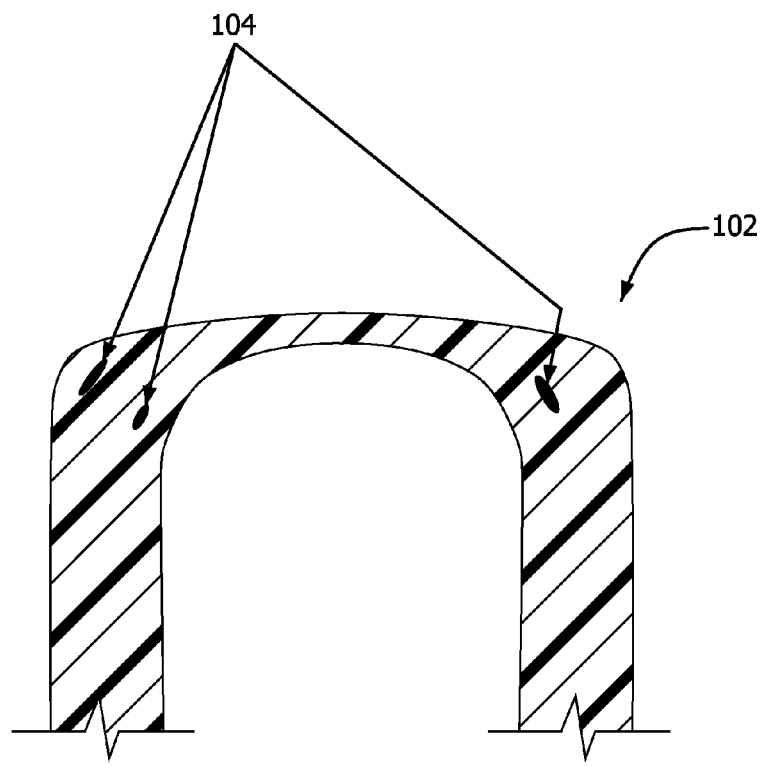
FIG. 15 is a cross-sectional side view of a the spar that was formed from a composite material using a conventional manufacturing process.
Figure 16:
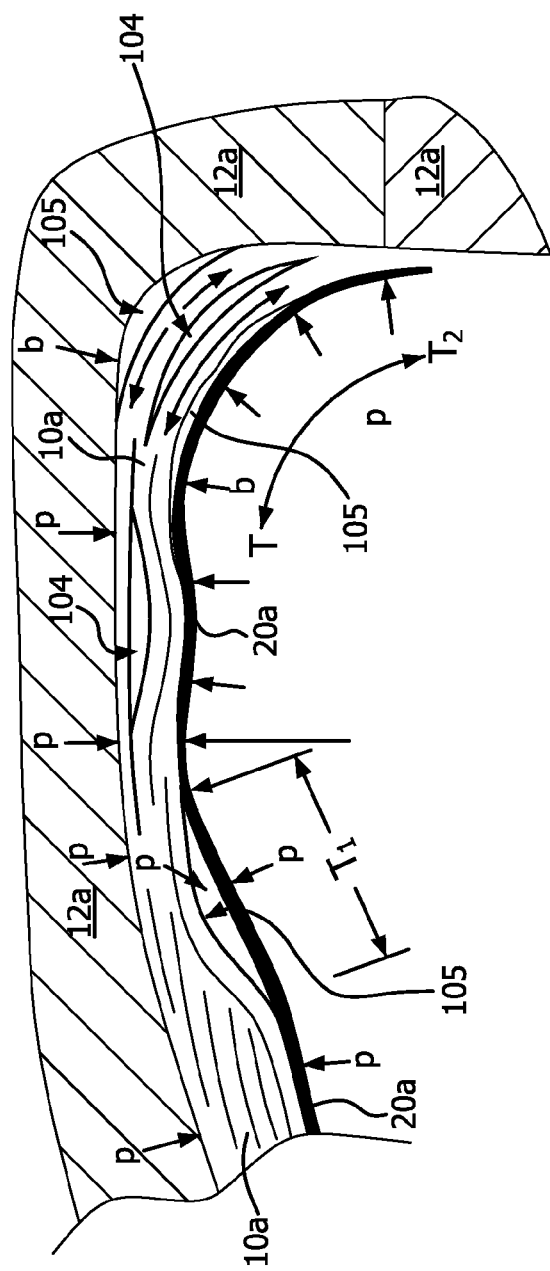
FIG. 16 depicts a portion of the spar shown in FIG. 15 as a pre-form from which the spar is being formed is consolidated by an inflatable bladder.
Figure 17:
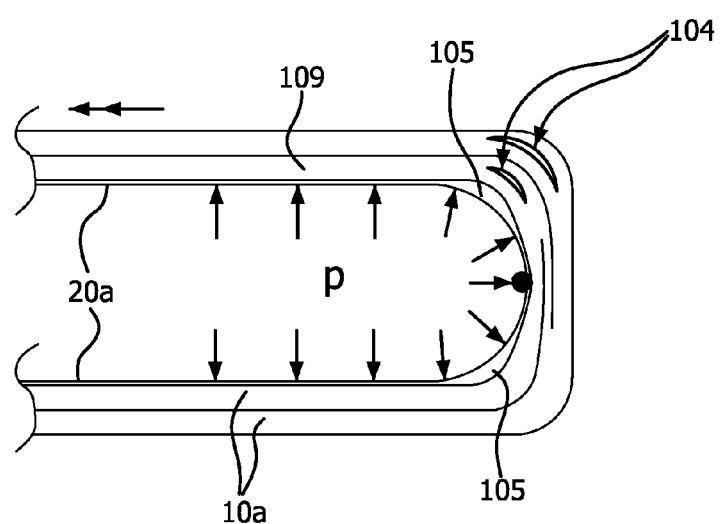
FIG. 17 depicts a portion of the pre-form and bladder shown in FIG. 15, during consolidation of the pre-form.

The use of the breather 34 and the end plate assembly 60 to eliminate some or all of the molten resin, air and other gases from within the pre-form 10 during the curing and consolidation process can help prevent the formation permanent voids in the finished spar, such as the voids 104 in the spar 102 shown FIG. 15. Eliminating or reducing the inter-layer voids can also result in a more uniform pressure being exerted the pre-form during the consolidation process than would otherwise be possible, which in turn can reduce the potential for localized areas of reduced strength in the finished spar. For example, FIG. 14 depicts a cross section of a portion of an actual spar 100 formed in accordance with the above-described process This figure illustrates the absence of any substantial voids in the corners, or anywhere else in the illustrated portion of the spar due, it is believed, to the elimination of inter-layer voids from the spar material during the curing and consolidation a result of the use of the breather 34 and the end plate assembly 60.

Moreover, the use of the breather 34 and the end plate assembly 60 to eliminate some or all of the molten resin, air, and other gases from within the gap between the pre-form 10 and the bladder 20 during the curing and consolidation process can help eliminate the voids or gaps that tend to form between the bladder 20, and the corner and other regions of the pre-form 10 the undergo abrupt changes in shape. The bladder 20 can thus exert pressure on these regions so as to properly consolidate the material in the regions and thereby avoid the formation of localized areas of reduced strength in the finished spar that can result from insufficient consolidation.

The foregoing description is provided for the purpose of explanation and is not to be construed as limiting the invention. Although the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, can make numerous modifications to the invention as described herein, and changes may be made without departing from the scope and spirit of the invention as defined by the appended claims.

What is claimed is:

1. A process for forming a hollow structure from a pre-form, comprising:
    providing a breather;
    positioning the breather between the pre-form and an inflatable bladder;
    providing a pressure relief valve in fluid communication with the breather;
    placing the pre-form, the bladder, and the breather in a mold;
    inflating the bladder so that the bladder exerts a pressure on the pre-form;
    heating the pre-form to cause at least a portion of the material from which the pre-form is formed to become molten and to assume a state of fluid communication with the breather; and
    curing the molten material;
    wherein the breather and the pressure relief valve are configured to provide a path for resin and gases to exit the molten material and reach the ambient environment around the mold in response to a pressure differential between the ambient environment around the mold and the resin and gases while the molten material is being heated and cured.

2. The process of claim 1, wherein providing a pressure relief valve in fluid communication with the breather comprises:
    positioning a gasket between a surface of the mold and a first plate so that an inner circumference of the gasket is in fluid communication with the breather;
    positioning a flange of the bladder between the first plate and a second plate;
    drawing the first and second plates toward each other to seal the flange of the bladder between the first and second plates; and
    fastening the gasket and the first and second plates to the mold so that the gasket is subjected to a clamping force that permits resin and gases to seep past the gasket in response to a pressure differential between inner and outer circumferences of the gasket.

3. The process of claim 2, further comprising connecting a source of pressurized air for inflating the bladder to the second plate.

4. The process of claim 1, wherein positioning the breather between the pre-form and the bladder comprises forming the pre-form around the breather and the bladder.

5. The process of claim 1, further comprising attaching the breather to an exterior surface of the bladder.

6. The process of claim 4, wherein forming the pre-form around the breather and the bladder comprises placing layers of a composite material over the breather and the bladder.

7. The process of claim 1, wherein the breather comprises a fibrous material.

8. A process for manufacturing a hollow structure, comprising:
    placing a pre-form in a mold;
    providing a breather;
    positioning the breather between the pre-form and an inflatable bladder;
    providing a pressure relief valve in fluid communication with the breather;
    heating the pre-form to cause at least a portion of the material form which the pre-form is formed to become molten resin;
    subjecting an interior surface of the pre-form to a pressure to urge an exterior surface of the pre-form into an adjacent surface of the mold; and
    curing at least a portion of the material from which the pre-form is formed;
    wherein the breather and the pressure relief valve are configured to provide a path for gases and the molten resin to exit the material from which the pre-form is formed and the mold, in response to a pressure differential between an ambient environment around the mold and the gases and molten resin, while the material from which the pre-form is formed is being cured.

9. The process of claim 8, wherein:

subjecting an interior surface of the pre-form to a pressure to urge an exterior surface of the pre-form into an adjacent surface of the mold comprises inflating a bladder positioned within the pre-form; and providing a breather comprises positioning the breather between the bladder and the pre-form so that the resin and gases within the material can enter the breather.

10. The process of claim 9, wherein providing a pressure-relief valve in fluid communication with the breather comprises: positioning a gasket between a surface of the mold and a first plate so that an inner circumference of the gasket is in fluid communication with the breather; positioning a flange of the bladder between the first plate and a second plate; drawing the first and second plates toward each other to seal the flange of the bladder between the first and second plates; and fastening the gasket and the first and second plates to the mold so that the gasket is subjected to a clamping force that permits resin and gases to seep past the gasket in response to a pressure differential between inner and outer circumferences of the gasket.

11. The process of claim 10, further comprising connecting a source of pressurized air for inflating the bladder to the second plate.

12. The process of claim 8, wherein providing a breather comprises providing a fibrous element capable of forming a passage for the resin and gases.

13. The process of claim 8, wherein providing a breather comprises positioning the breather so that the breather is in fluid communication with the molten resin.

14. The process of claim 8, wherein the breather and the pressure relief valve are configured to provide a path for the molten resin and gases to reach the ambient environment around the mold.

* * * * *